United States Patent [19]

Wirt

[11] 4,195,716
[45] Apr. 1, 1980

[54] BRAKE RELEASE MECHANISM
[75] Inventor: Leon A. Wirt, Joliet, Ill.
[73] Assignee: Caterpillar Tractor Co., Peoria, Ill.
[21] Appl. No.: 917,213
[22] Filed: Jun. 19, 1978

Related U.S. Application Data

[63] Continuation of Ser. No. 714,427, Aug. 13, 1976, abandoned.

[51] Int. Cl.² ............................................. B60K 41/20
[52] U.S. Cl. .................................. 192/3 R; 192/4 A
[58] Field of Search ............. 192/3 N, 4 B, 4 A, 3 R, 192/4 R

[56] References Cited

U.S. PATENT DOCUMENTS

| | | | |
|---|---|---|---|
| 3,201,179 | 8/1965 | Ostgaard | 60/403 X |
| 3,390,523 | 7/1968 | Heidemann et al. | 192/4 B X |
| 3,672,161 | 6/1972 | Krusche et al. | 60/445 |
| 3,854,559 | 12/1974 | Talak et al. | 192/4 A |

OTHER PUBLICATIONS

C. L. Braun, Design Concepts of the New John Deere JD 750/255 Dual Path Hydrostatic Crawler Tractors; Society of Automotive Engineers; 760407; Apr. 26–28, 1976; pp. 1–12.

*Primary Examiner*—George H. Krizmanich
*Attorney, Agent, or Firm*—Phillips, Moore, Weissenberger, Lempio & Majestic

[57] ABSTRACT

A brake release mechanism for a spring-loaded, normally applied vehicle brake releasable by system hydraulic pressure when said system is disabled includes a manual cut-off valve for isolating said brake from the disabled system and manual hydraulic pump means communicating with said brake for supplying fluid pressure thereto.

Manual or pilot operated shunt means are provided for shunting a hydraulic motor associated with the brake to allow free turning thereof during towing.

6 Claims, 2 Drawing Figures

BRAKE RELEASE MECHANISM

This is a continuation, of Ser. No. 714,427, filed Aug. 13, 1976 now abandoned.

This invention relates to vehicles which have hydraulic motors for driving the vehicle, and associated brakes which are normally applied by spring pressure and are releasable by hydraulic pressure supplied by the hydraulic system of the vehicle. In such vehicles, a problem arises upon failure of the power plant or the vehicle hydraulic system, or related systems which affect the hydraulic system, because without system hydraulic pressure the vehicle braks cannot be released to allow movement of the vehicle to a suitable repair facility.

It is therefore an object of the present invention to provide a mechanism for hydraulically releasing normally applied brakes for towing or other movement of a vehicle upon failure of the vehicle brake release hydraulic pressure.

It is also an object of this present invention to provide a means for shunting a vehicle hydraulic motor upon failure of the vehicle hydraulic system fluid pressure to allow towing thereof.

These objectives are achieved by providing a manual cut-off valve in the hydraulic system line communicating fluid pressure to the vehicle brake mechanism to allow for isolation of the brake mechanism from the disabled hydraulic system, and by providing a manual hydraulic pump to allow manual pressurization of the vehicle brake for release thereof. The inlet and exhaust lines communicating with the hydraulic motor are connected by a shunt conduit provided with a valve for communicating the inlet and exhaust lines to the motor to allow free turning thereof while moving the vehicle.

An alternative embodiment of the present invention provides a pair of opposed, pilot operated check valves in the hydraulic motor shunt conduit which are responsive to fluid pressure provided by the manual hydraulic pump to shunt the hydraulic motor upon operation of the pump.

Figure 1:
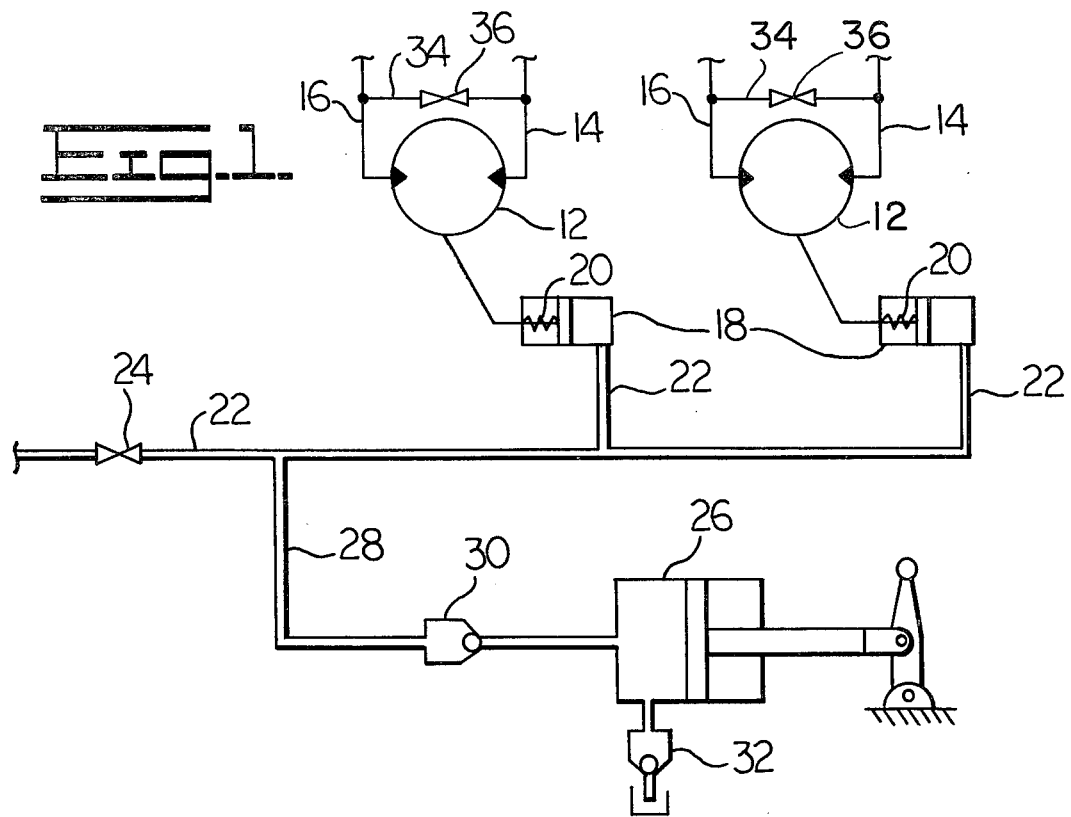
FIG. 1 is a schematic drawing of the brake release mechanism of the present invention shown provided on a vehicle having two brakes and two hydraulic motors.

Referring to FIG. 1, the present invention is shown schematically on a vehicle brake system which includes a pair of hydraulic motors 12 for driving the vehicle by means of pressurized hydraulic fluid applied through pressure inlet lines 14 and returned by means of exhaust lines 16.

Associated with each hydraulic motor is a brake mechanism shown schematically at 18, which is of the normally applied type wherein a spring 20 biases the brake mechanism toward an applied configuration, and the brake mechanism is releasable by hydraulic fluid pressure supplied through a brake conduit 22 which selectively supplies hydraulic fluid from a brake control mechanism not shown.

Provided in brake conduit 22 is a manual cut-off valve 24 for isolating the brake mechanisms from the brake line leading from the brake control mechanism not shown.

A manual hydraulic pump 26 is disposed in an auxiliary conduit 28 together with associated check valves 30 and 32 for manually pumping hydraulic fluid from the vehicle sump into brake conduit 22.

Shunt conduits 34 communicate the hydraulic motor inlet lines 14 with exhaust lins 16 and have shunt valves 36 disposed therein for manually opening shunt conduits 34 when towing or otherwise moving a disabled vehicle, allowing hydraulic motors 12 to be turned freely by the vehicle traction gear as the vehicle is moved.

When a vehicle embodying the invention just described experiences a hydraulic failure due to either a failure of the vehicle engine or hydraulic pumps, or failure in the hydraulic system lines, hydraulic pressure will be lost in brake conduit 22, and brakes 18 will be applied under the influence of springs 20, stopping the vehicle. If it is thereafter desired to push or tow the vehicle to a suitable repair facility, cut-off valve 24 is closed, and manual pump 26 is actuated to again pressurize brake conduit 22 to release brakes 18.

Shunt valves 36 are opened to allow hydraulic fluid in the hydraulic motors to circulate in the circuit completed by the opened shunt conduits 34.

Figure 2:
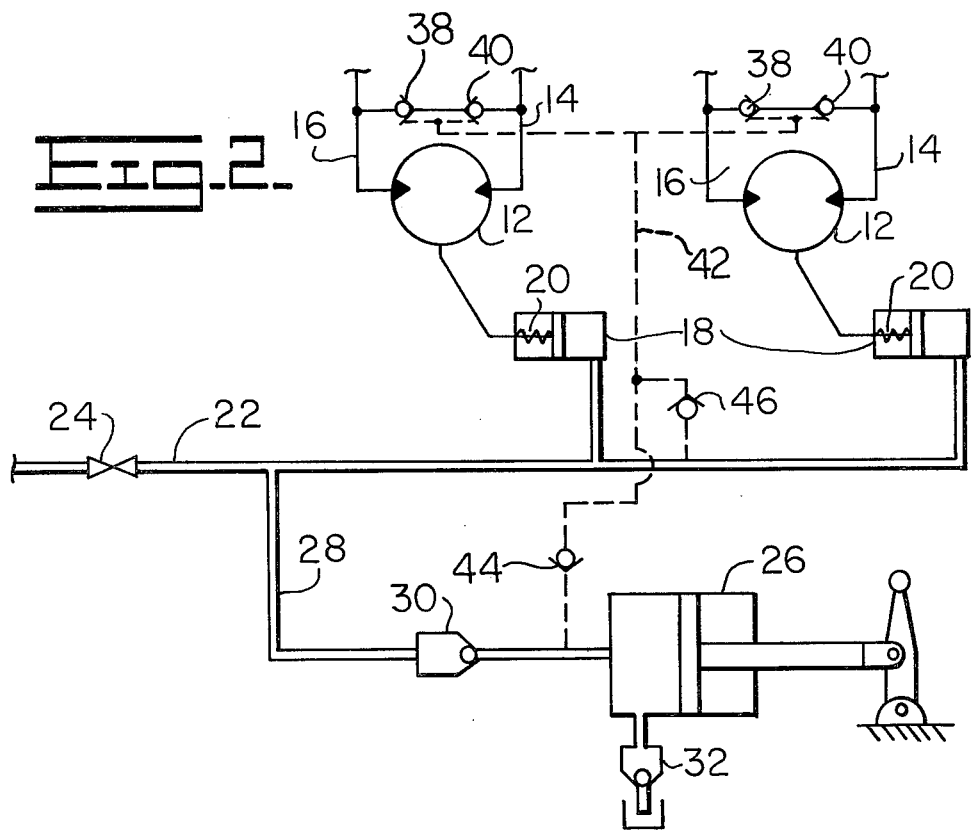
FIG. 2 is a schematic drawing of an alternative embodiment of the brake release mechanism of the present invention.

An alternative embodiment of the present invention is shown in FIG. 2 wherein manual shunt valve 36 is replaced by a pair of opposed, pilot operated check valves 38 and 40. A pilot pressure conduit 42 communicates from auxiliary conduit 28 to the two pilot operated check valves to open the valves upon pressurization of auxiliary conduit 28 and brake conduit 22 to shunt the hydraulic motors upon pressurization of the brakes for release. A check valve 44 is provided in the pilot pressure conduit to maintain the pressure therein during operation of the manual pump, and a relief valve 46 is provided which communicates with brake conduit 22.

Still another alternative shunt valve arrangement could employ a spool valve disposed in the shunt conduit and slidable in response to pilot pressure to open the shunt conduit.

What is claimed is:

1. In a vehicle having a hydraulic fluid drive motor, a spring applied brake associated with said drive motor and releasable by hydraulic fluid pressure, and pressurized hydraulic system means for communicating fluid pressure to said brake to release said brake, the improvement comprising auxiliary brake release means for releasing said brake, said auxiliary brake release means including:
   (a) a manual cut-off valve connected between said brake and said pressurized hydraulic system means;
   (b) auxiliary conduit means, connected between said cut-off valve and said brake, for communicating fluid pressure with said brake; and
   (c) manual hydraulic pump means for pumping fluid through said auxiliary conduit means to said brake.

2. In a vehicle according to claim 1 further including manual bypass valve means for shunting hydraulic fluid across said motor.

3. In a vehicle according to claim 1 further including means for shunting hydraulic fluid across said motor.

4. In a vehicle having a hydraulic fluid drive motor, a spring applied brake associated with said drive motor and releasable by hydraulic fluid pressure, pressurized hydraulic system means for communicating fluid pressure to said brake, and a sump, the improvement comprising auxiliary brake release means for releasing said brake, said auxiliary brake release means including:

(a) a manual cut-off valve connected between said brake and said pressurized hydraulic system means;
(b) auxiliary conduit means, connected between said cut-off valve and said brake, for communicating said brake with said sump;
(c) manual hydraulic pump means for pumping fluid from said sump through said auxiliary conduit means to said brake; and
(d) check valve means for preventing fluid being pumped by said pump means from returning to said sump.

5. In a vehicle having a hydraulic fluid drive motor having a fluid inlet line and a fluid outlet line, a spring applied brake associated with said drive motor and releasable by hydraulic fluid outlet line, a spring applied brake associated with said drive motor and releasable by hydraulic fluid pressure, and pressurized hydraulic system means for communicating fluid pressure to said brake to release said brake, the improvement comprising auxiliary brake release means for releasing said brake, said auxiliary brake release means including:
(a) manual cut-off valve means for isolating said brake from said pressurized hydraulic system means;
(b) auxiliary conduit means for communicating fluid pressure with said brake;
(c) manual hydraulic pump means for pumping fluid through said auxiliary conduit means to said brake; and
(d) means for shunting hydraulic fluid across said motor, including:
  (i) shunt conduit means for communicating said inlet line with said outlet line;
  (ii) shunt valve means for opening and closing said shunt conduit means;
  (iii) pilot pressure conduit means for communicating said auxiliary conduit means with said shunt valve means, said shunt valve means being responsive to fluid pressure in said auxiliary conduit means; and
  (iv) check valve means for maintaining fluid pressure in said pilot pressure conduit means.

6. In a vehicle according to claim 5 wherein said shunt valve means includes a pair of check valves, said valves being disposed in opposing relationship in said shunt conduit means.

* * * * *